United States Patent [19]
Blankenship

[11] Patent Number: 5,218,724
[45] Date of Patent: Jun. 15, 1993

[54] INCINERATOR TOILET WITH REMOVABLE CATALYST CONTAINER

[75] Inventor: Ernest B. Blankenship, Dallas, Tex.

[73] Assignee: Research Products/Blankenship Corporation, Dallas, Tex.

[21] Appl. No.: 798,571

[22] Filed: Nov. 26, 1991

[51] Int. Cl.[5] .............................................. A47K 11/02
[52] U.S. Cl. .................................................... 4/111.5
[58] Field of Search ..................... 4/111.1, 111.2, 111.5

[56] References Cited

U.S. PATENT DOCUMENTS 3,921,227 11/1975 Blankenship ......................... 4/111.5
3,943,579 3/1976 Blankenship ......................... 4/111.5

Primary Examiner—Charles E. Phillips
Attorney, Agent, or Firm—Arthur F. Zobal

[57] ABSTRACT

An electrical incinerator toilet having an incinerator chamber and a removable catalyst container for holding a removable catalyst cartridge or unit.

5 Claims, 8 Drawing Sheets

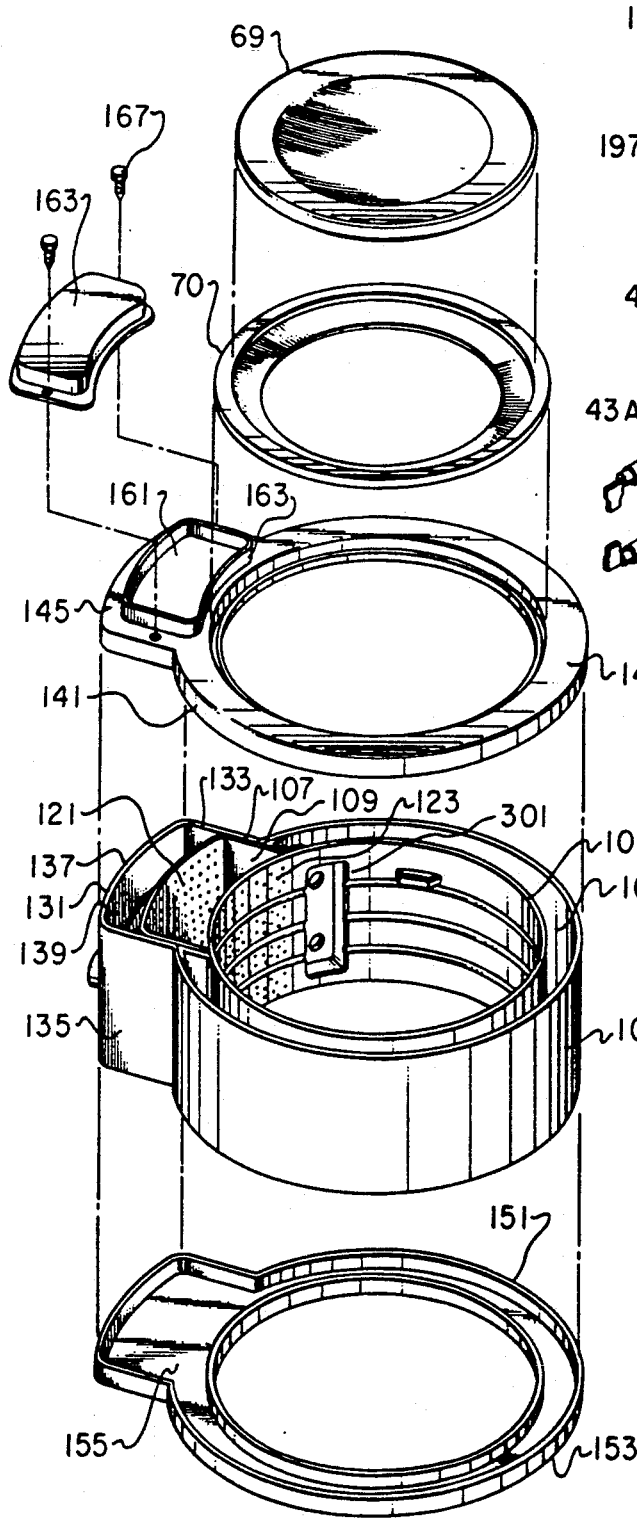
Fig. 2
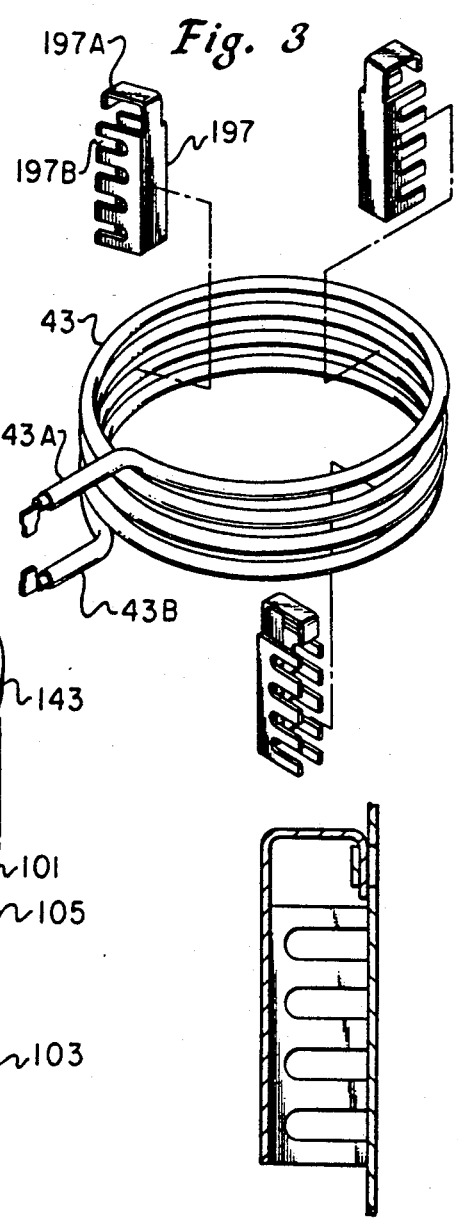
Fig. 3
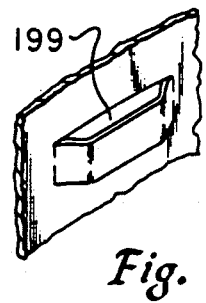
Fig. 5
Fig. 6

INCINERATOR TOILET WITH REMOVABLE CATALYST CONTAINER

BACKGROUND OF THE INVENTION

U.S. Pat. No. 4,823,408 discloses an electrically actuated incinerator toilet having a catalyst container fixed to the toilet into which catalyst pellets for reducing odor are inserted and removed for replacement. The toilet is effective although clean out and insertion of the catalyst pellets can be time consuming.

SUMMARY OF THE INVENTION

It is an object of the invention to provide an electrical incinerator toilet with a removable catalyst container for holding a removable catalyst cartridge or unit which makes replacement of the catalyst simple with no clean-up required.

In the embodiment disclosed, wall structure is secured to the inner cylindrical side wall of the chamber around perforations. A removable container is provided having inner and outer ends with said inner end being movable into and out of the wall structure by way of said opening thereof. A catalyst means is movable as a single unit into and out of the container by way of said outer end of said container. When the movable container with its inner end is located in said wall structure with the catalyst unit located in said removable container, gases may be drawn from the incinerator chamber by way of said perforations, said wall structure, said removable container and said catalyst unit.

BRIEF DESCRIPTION OF THE DRAWINGS

FIGS. 1-12 illustrate the incinerator toilet and ash pans of U.S. Pat. No. 4,823,408.

FIG. 1 is a cross sectional side view of the incinerator toilet.

FIG. 2 is an exploded view of an incinerator chamber member of the toilet.

FIG. 3 is an exploded view of the electrical heating coil and its supporting brackets employed in the incinerator chamber member of FIGS. 1 and 2.

FIG. 4 is a cross section of FIG. 1 taken along the lines 4—4 thereof.

FIG. 5 is a side view of one of the brackets employed for securing the electrical coil within the incinerator chamber member.

FIG. 6 illustrates a slot formed in the inner wall of the incinerator chamber member in which the upper hook of the bracket of FIG. 5 may be inserted for holding the bracket in place.

FIG. 7 is a cross sectional view of FIG. 4 taken along the lines 7—7 thereof.

FIG. 8 is a cross sectional view of FIG. 4 taken along the lines 8—8 thereof.

FIG. 9 is an exploded view of a removable ash pan employed in the toilet of FIG. 1.

FIG. 10 is a partial cross sectional side view of the toilet of FIG. 1 illustrating that the ash pan is removable.

FIG. 11 is an exploded view of another embodiment of an ash pan of the toilet.

FIG. 12 is a partial cross sectional side view of the toilet of FIG. 1 illustrating the removable ash pan of FIG. 11 located therein.

DESCRIPTION OF THE INCINERATOR TOILET AND ASH PAN OF U.S. PAT. NO. 4,823,408

Figure 1:
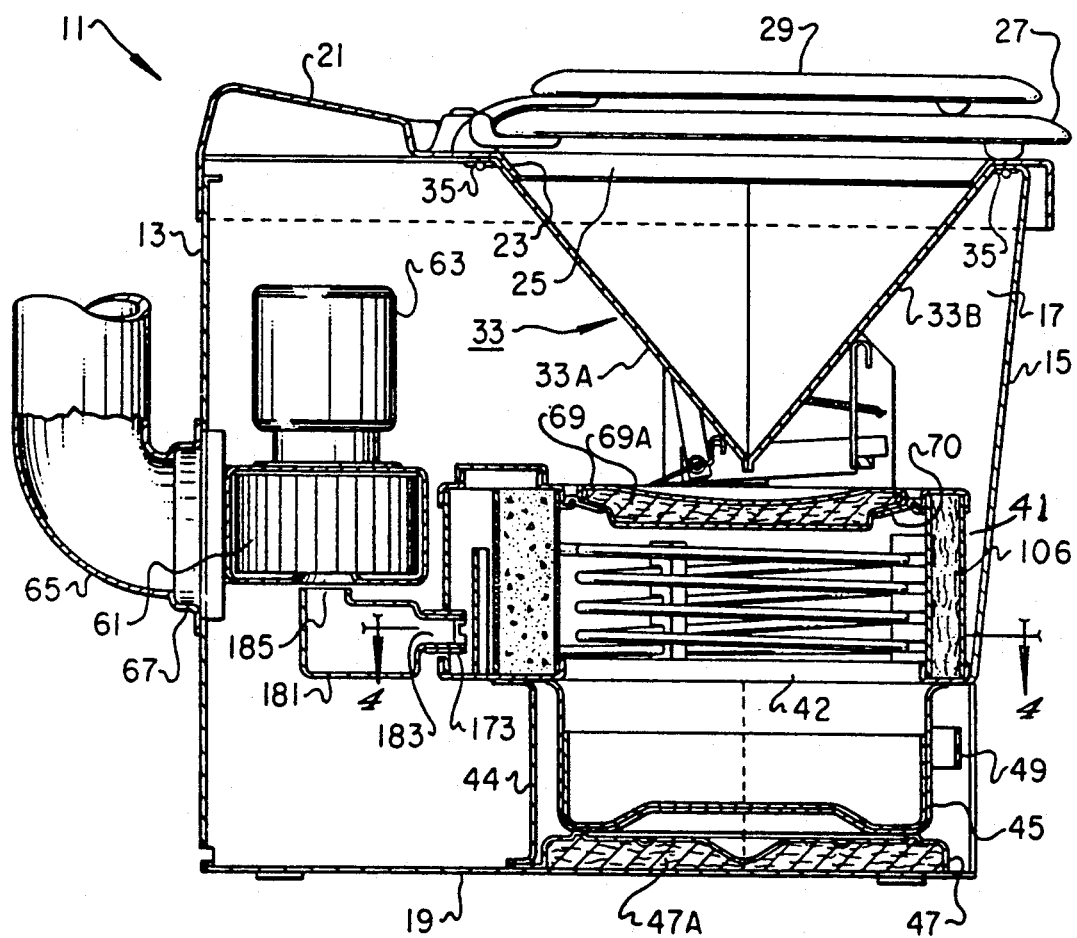

Referring to FIG. 1, the incinerator toilet comprises a housing 11 formed by a rear wall 13, a front wall 15, two side walls, one of which is identified at 17, a bottom wall 19, and a top 21. The front, rear, sides, and bottom walls and the top 21 are preferably formed of mild steel. The forward portion of the top 21 includes a recessed upper bowl portion 23 forming an upper opening 25 which extends downward from the top 21. Located above and around the bowl 23 is a hinged seat 27 adapted to be located in the position shown or moved to an upward position. A hinged lid 29 is adapted to fit over the seat 27. The lid 29 also may be moved to an upward position independently of the seat. The seat 27 and the lid 29 are hinged to the top 21 by way of a hinge arrangement illustrated at 31. A lower bowl portion 33 is located below the upper bowl portion 23 and is transversely divided into two halves 33A and 33B which are pivotally mounted to the underside of the top 21 by way of hinges 35. When the toilet is being used, the halves 33A and 33B will be in their closed position whereby a cone-shaped paper insert may be located within the lower bowl portion 33.

The incinerator toilet comprises an open ended incinerator chamber member 41 located below the bowl and which has a circular electrical heating coil 43 located in its central opening 42. The chamber member 41 is mounted on a semi-circular metal support 44. An ash pan 45 is slideably mounted on a metal step support 47 formed on the housing bottom 19 within the chamber support 44 and below the central opening 42 of the chamber member 41. Heat insulation materials 47A is located between the support 47 and the bottom 19. The ash pan 45 has a handle 49 on its front side which is accessible by means of a removable panel (not shown) but which will be located below the front wall 15. A blower wheel 61 and a motor 63 are provided for drawing gases from the interior of the chamber 41 and the pan 45 and then through a heat activated odor reducing catalyst 81 and then out of a rear vent 65 which is connected to the rear wall 13 of the housing by way of a collar 67. An incinerator chamber lid 69, which fits into a recessed seat 70 formed at the upper end of the chamber 41, is provided for closing the upper end of the chamber 41 while the heater coil 43 is being energized for disposing of the waste received in the pan 45. The outer walls of the lid 69 are formed of stainless steel with heat insulation material 69A located within the walls.

When the incinerator toilet is being used by a person, the lower bowl halves 33A and 33B will be located in their closed position as shown in FIG. 1 and a cone-shaped paper insert located within the lower bowl portion 33. When it is desired to deposit the waste in the paper cone within the pan 45, the chamber lid 69 will raised upward and out of its recessed seat and then swung to the side and out of the way to allow the hinged halves 33A and 33B to swing open to allow the paper cone and the waste to drop through the central opening 42 of the chamber 41 and into the pan 45. A linkage mechanism controlled by a foot pedal suitable for allowing the bowl halves 33A and 33B and the chamber lid 69 to operate in this manner is disclosed in U.S. Pat. No. 3,890,653, granted on Jin. 24, 1975, and entitled "Incinerator Toilet Having A Vertically Movable Incinerator Chamber Lid". After the paper cone and waste have been deposited in the pan 45, the foot pedal again will be actuated to return the chamber lid 69 to its closed position and to return the bowl halves 33A and 33B to their closed positions. A switch then may be actuated to complete a circuit to the electrical coil 43 and to the blower motor 63. A timer is set thereby causing the heater and exhaust blower to come into operation, staying on until the incinerator process and cooling process are completed. Gases from the chamber 41 are drawn through the heat activated catalyst 81 for reducing the odor and then through the ventline 65. Residual ash is collected in the removable ash pan 45.

Figure 4:
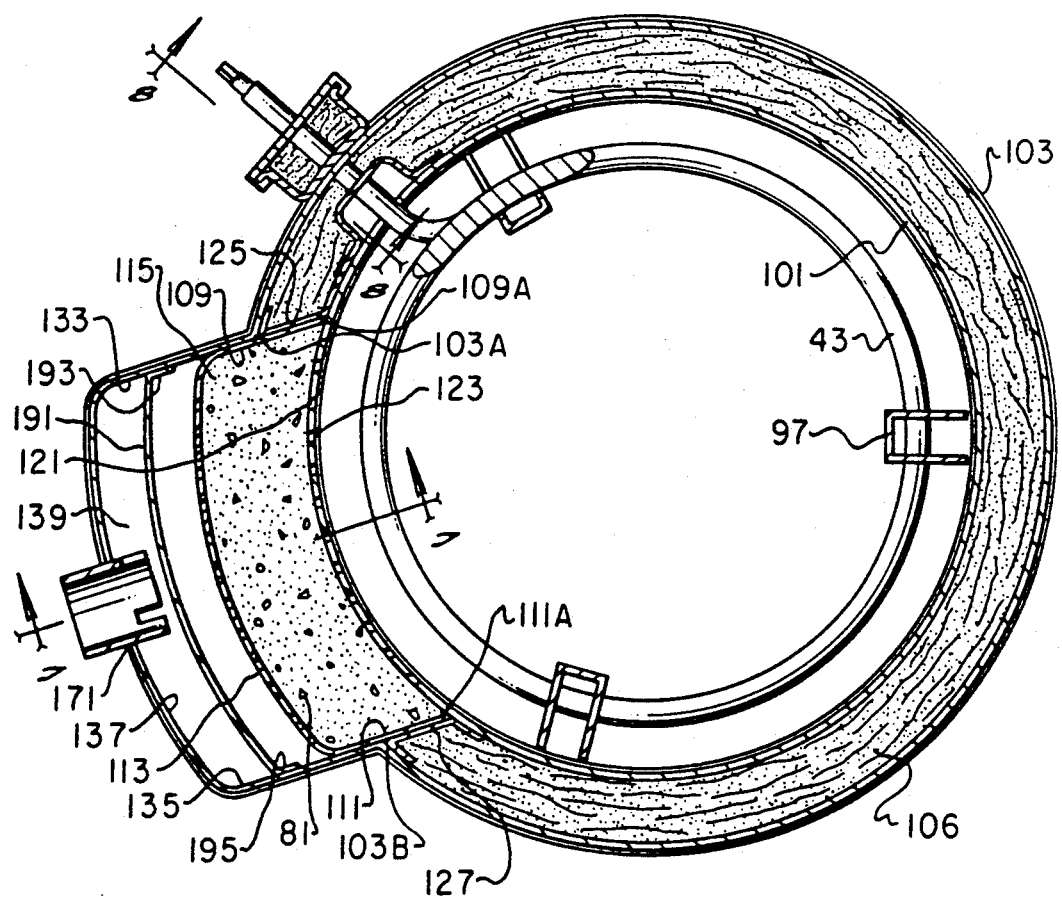
Figure 7:
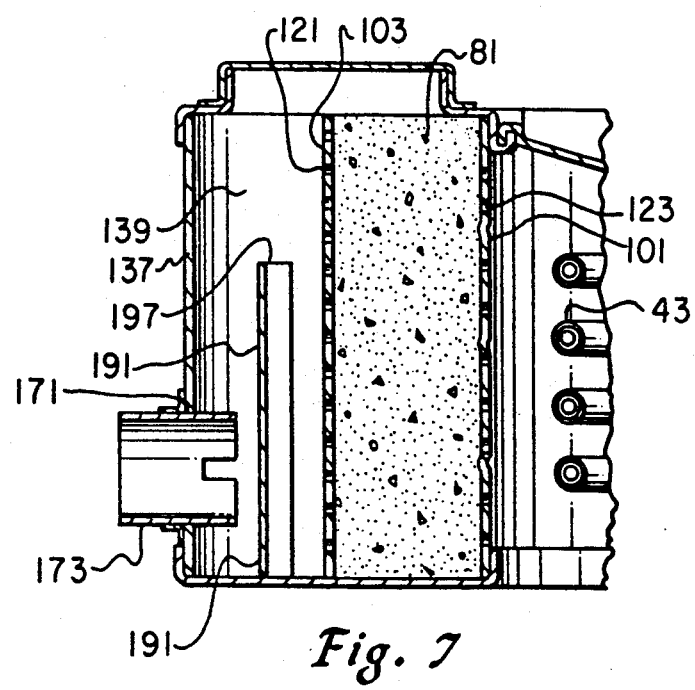

Referring now to FIGS. 1, 2, 4, and 7, the incinerator chamber member 41 is formed by a cylindrical shaped inner side wall 101 and a partially cylindrical shaped outer side wall 103 spaced from the partially surrounding the inner side wall 101 forming a partially annular heat insulation holding space 105 therebetween. The heat insulation is illustrated in FIGS. 1 and 4. A U-shaped outer catalyst chamber side wall 107 is coupled to the inner wall 101 and to the outer wall 103 for forming a catalyst chamber or container 109. The U-shaped member 107 has two legs 109 and 111 and an arcuate portion 113 having a radius greater than the radius of the wall 103. The edges 109A and 111A of the legs 109 and 111 are connected to the outer surface of the cylindrical member 101 and the outer sides of the legs 109 and 111 are connected to the edges 103A and 103B of the partially cylindrical shaped member 103 with the arcuate portion 113 extending outward beyond the outer wall 103 on one side of the diameter of the wall 103 forming a catalyst chamber 115 for receiving the heat activated odor reducing catalyst 81. Perforations 121 are formed through the arcuate portion 113 of the U-shaped member 107 and perforations 123 are formed through the cylindrical shaped inner wall 101 between the edges 109A and 111B of the legs of the U-shaped member 107. U-shaped brackets 125 and 127 are secured against the outside of the legs 109 and 111 and to the outside and the inside of the wall members 101 and 103 whereby the heat insulation chamber 105 and the catalyst chamber 107 are separated from each other. A second U-shaped wall member 131 having legs 133 and 135 and an arcuate shaped portion 137 is provided with the legs 133 and 135 being located against the outward portions of the legs 109 and 111 and with their edges 133A and 135A secured to the edges 103A and 103B of the outer wall member 103 such that the outer portion of the U-shaped member 131 including the arcuate shaped wall portion 137 extends outward of the wall portion 137 forming a collection chamber 139.

A top wall 141 comprising an annular wall portion 143 and an outward extending portion 145 is coupled to the upper ends of the wall members 101 and 103 and 107 and 131 and a bottom wall 151 comprising an annular wall portion 153 and an outward extending portion 155 is coupled to the lower ends of the wall members 101 and 103 and 107 and 131 to effectively seal the heat insulation chamber 105 from the catalyst chamber 115 and the collection chamber 139 and all of the chambers 105, 115, and 139 from the atmosphere. The outward extending portion 145 of the top wall 141 has an aperture 161 formed therethrough with a vertical wall 163 extending around the aperture and upward from the top portion of the wall portion 145 such that the aperture 161 is in fluid communication with both the catalyst chamber 115 and the collection chamber 139. A removable lid 165 is adapted to fit over the wall 163 and hence over the opening 161 and to be secured to the top wall 141 with bolts 167.

An exhaust port or opening 171 is formed through the wall portion 173 of the U-shaped member 131 at its lower end midway between its side walls 133 and 135. An exhaust tube 173 is located in the aperture 171 and an outlet chamber 181 has an inlet tube 183 located in the tube 173 and an outlet 185 located below the blower 161. A U-shaped baffle 191 has its lower end 192 secured and sealed to the inside of the outward extending portion 155 of the bottom wall 151 and its side legs 193 and 195 secured to the inside of the legs 133 and 135 of the U-shaped member 131. The top 197 of the baffle 191 is lower than the top wall 141 of the chamber member and above the exhaust port 171, 173. Thus, when the blower is operating, the gases from inside of the chamber member 41 and the ash pan 45 pass through the perforations 123, through the heat activated catalyst 81, through the perforations 121, above the top edge 197 of the baffle 191 through the exhaust port 171, 173 and into and through the exhaust chamber 181 by way of its inlet 183 and outlet 185 and then by way of the blower 161 through the exhaust vent 65.

The perforated section of the inner wall 101 has an arc length of about six inches and a height of about three and one-half inches. The height of the arcuate portion 113 also is about three and one-half inches. The distance between the perforated section of the cylindrical wall 101 and the arcuate portion 113 is about two inches such that the catalyst chamber has a total volume of about forty cubic inches. The collection chamber has a thickness from wall 113 to wall 137 is about one and one-quarter inches with an areal extent of six by four or twenty four square inches, having been reduced from ten by four or forty square inches of the earlier versions. Thus, the pressure distribution across the outer face of the perforated catalyst chamber is more nearly equalized because of the greater thickness and smaller area of the catalyst chamber. The catalyst is easily added through the port or opening 161 by removing the cap 163. Alternatively, old or deteriorated catalyst can be vacuumed out through the opening 161 which has dimensions of about one and one-quarter of an inch by four inches which is adequate for the nozzle of the ordinary home vacuum. Dust from the powdered catalyst generally accumulates in the lower portion of the catalyst chamber or container and is carried into the collection chamber along its lower level. The metal plate or baffle 191 is located midway between the walls 113 and 137 of the collection chamber and extends upward to a position about two thirds of the height of the collection chamber. The baffle 191 is sealed to the bottom 155 of the collection chamber. The baffle 191 thus causes dust to drop out and to be collected in the bottom in front of the baffle whereby the dust is prevented from entering the blower and depositing on the blower impeller. The collected dust can be vacuumed out from time to time.

Only a small portion of air drawn into the toilet goes into the incinerator chamber—only enough to permit complete incineration of the waste. Approximately ninety-five percent of the intake air traverses the space about the incinerator chamber thereby carrying away heat from the exterior incinerator wall.

Figure 9:
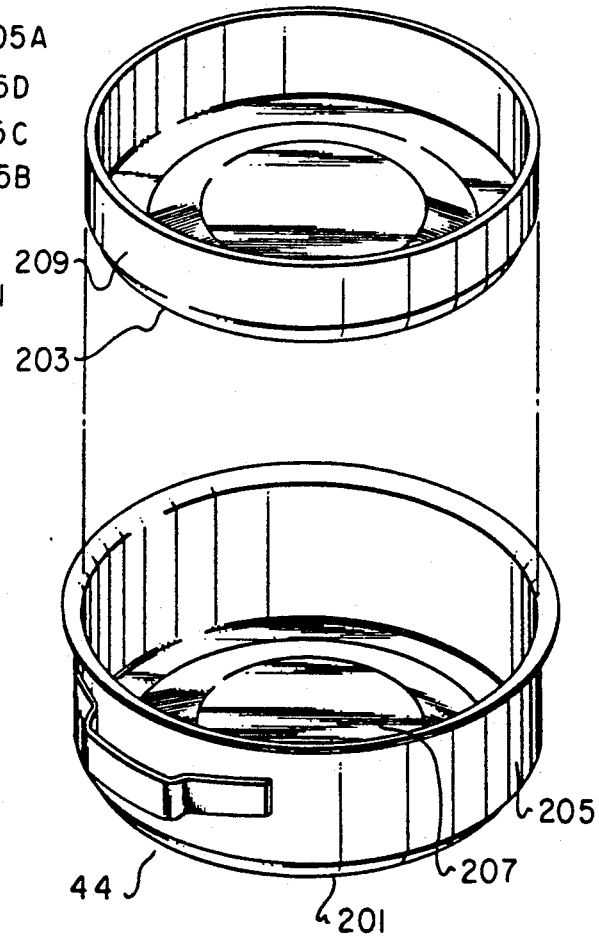
Figure 10:
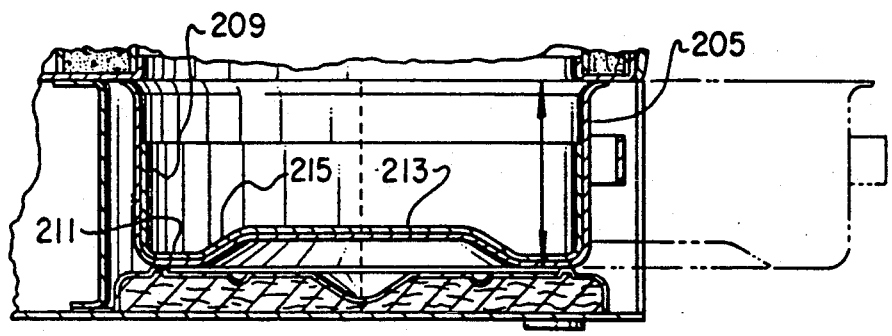

Referring to FIGS. 9 and 10, the ash pan 45 is a composite ash pan formed by an outer pan 201 of stainless steel and an inner or insert pan 201. The pan 45 is readily removed for emptying or replacement when needed at an inconsequential cost because of its simplicity of manufacture. The center portion of the inner pan 203 may be raised to close proximity to the heater 43 and yet readily conducts gathered heat to its lower portion for increased rate of evaporation of liquids accumulated in the bottom portion. In other words, the aluminum conducts heat into a portion not directly exposed to the radiant heat of the heater 43 itself. The outer pan 201 comprises an outer annular side wall 205 and a bottom wall 207. The inner pan 203 comprises an annular surrounding side wall 209, an annular lower wall portion 211 extending inwardly from the lower end of the annular surrounding side wall 209, and a raised portion 213 spaced inwardly of the annular surrounding side wall 209. The raised central portion comprises an annular inner side wall 215 extending upwardly from the annular lower wall portion 211 such that the annular inner side wall 215 is spaced from the annular surrounding side wall 209 with the raised portion 213 forming an upper platform connected to the upper end of the annular inner side wall 215. In the embodiment of FIGS. 9 and 10, the lower portion of the outer pan 201 is shaped similar to the lower portion of the inner pan 203 whereby the lower portion of the inner surface of the outer pan 201 and the outer surface of the inner pan 203 engage each other when the inner pan is inserted in the outer pan.

Figure 11:
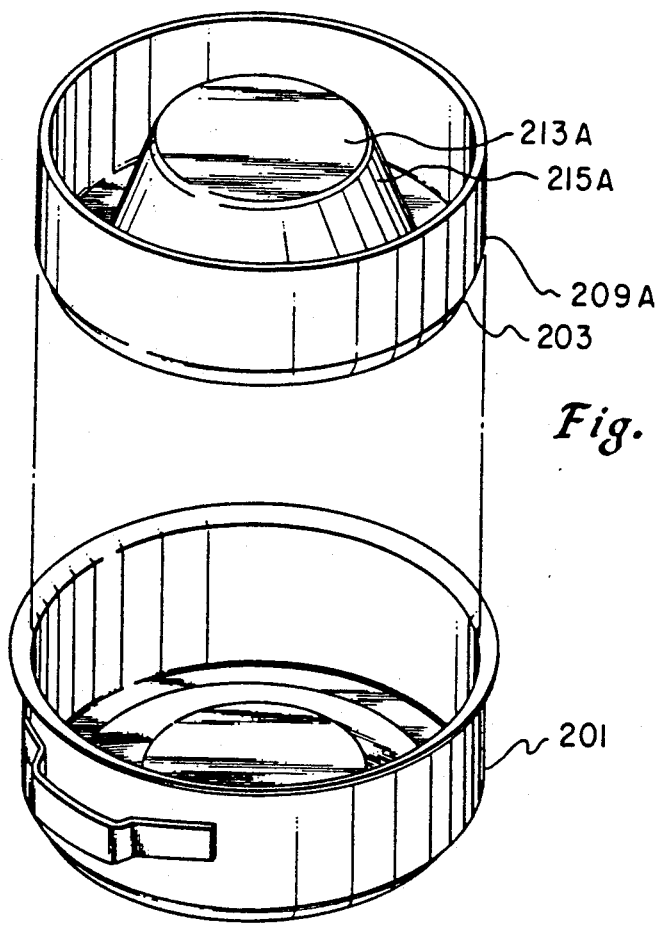
Figure 12:
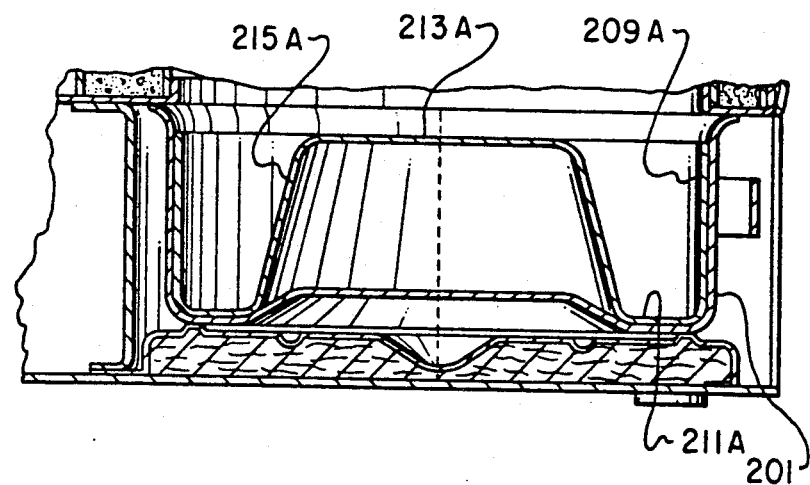

Referring to FIGS. 11 and 12, the outer pan 201 is the same as that of the outer pan of FIGS. 9 and 10. The inner pan 203 is modified in that its annular wall 209A is higher and the annular inner wall 215 is higher such that the upper wall 213A extends upward to about the same height as the upper edge of the wall 209A and both the upper wall 213 and the upper edge of the surrounding wall 209A extend to nearly the height of the upper edge of the outer pan 201. The outer surfaces of the walls 215A and 213A do not engage the bottom of the outer pan 201 and are spaced therefrom as shown in FIG. 12. In the embodiment of FIGS. 11 and 12, the platform 213A is raised substantially above the lower portion 211 of the inner pan whereby the solid portion of the human waste is separated from the liquid portion with the solid portion being deposited on the platform 213A and the liquid portion flowing to the lower portion 211A. Thus, the solids deposited on the platform 213A are maintained closer to the heater thereby decreasing the time of incineration and increasing the efficiency and lowering the amount of energy required. The liquids in the bottom portion 211A evaporate rapidly since the aluminum conducts heat into the lower portion 211A which may not be directly exposed to the radiant heat of the heater itself. Since the net or effective volume of the composite pan is reduced by virtue of the raised portion 215A and 213A, the height of the wall 209A is made approximately the same as that of the raised portion 215A and 213A to effectively increase the volume of the inner pan 203.

In one embodiment, the outer pan 201 is formed of 304 stainless steel. Pan 201 has a height of four inches and the outside diameter of wall 205 is ten inches. The wall thickness of pan 201 is 0.062 of an inch. The inner pan 203 is formed of a drawable aluminum such as 3003H14 aluminum. The wall thickness of the pan 203 is 0.125 of an inch. It is to be understood that the pans 201 and 203 may have different dimensions and formed of different variations of stainless steel and aluminum respectively.

Referring to FIGS. 3, 5, and 6, the arrangement for supporting the electrical heater coil 43 within the chamber 41 comprises three removable brackets 197 having hooks 197A formed at their upper ends. The brackets 197 have slots 197B adapted to receive the turns of the heater coil 43. The hook 197A of the brackets are inserted in slots 199 formed in the inside wall of the cylindrical member 101 for securing the brackets to the inside of the wall 101 while holding and supporting the electrical coil 43. The brackets 197 can be removed from the inner wall 101 to allow the coil 43 to be removed therefrom.

Figure 8:
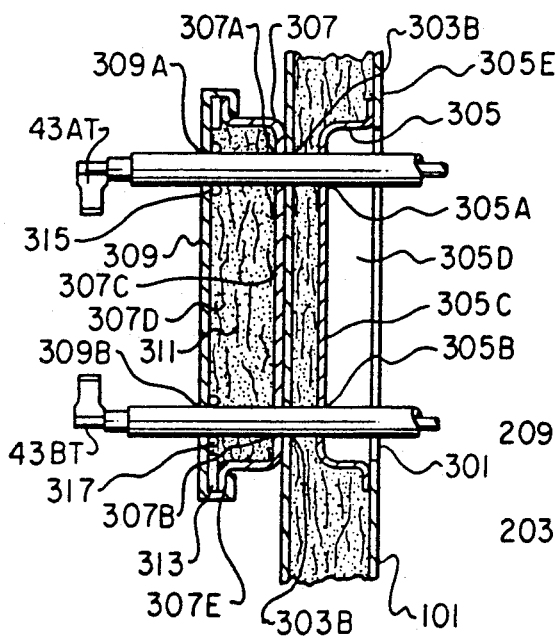

The coil 43 has two terminal ends 43A and 43B. Referring specifically to FIGS. 2 and 8 there will now be described an arrangement for facilitating the insertion of the terminal ends of the coil 43 through the inner and outer walls of the chamber 41 thereby facilitating removal and replacement of the coil for servicing. The terminal ends 43A and 43B have tabs 43AT and 43DT which are removed when the terminal ends are being inserted or removed from the chamber 41. A large rectangular shaped aperture 301 is formed through the inner wall 101 and two spaced apertures 303A and 303B are formed through the outer wall 103 on one side of the catalyst chamber as shown in FIG. 2. When the inner and outer members 101 and 103 are assembled, the apertures 303A and 303B will be in alignment with the large aperture 301. Also provided is an inner cup shaped member or pan 305 and an outer cup shaped member or pan 307. Member 305 has two small apertures 305A and 305B formed in its back end 305C and a large opening 305D surrounded by a flange 305E. The flange 305E is welded to the outer surface of the wall 101 such that the apertures 305A and 305B are in alignment with the apertures 303A and 303B respectively and such that the opening 305D is in alignment with the opening 301. Pan 307 also has two small apertures 307A and 307B formed in its back end 307C and a large opening 307D formed in its front end and surrounded by a flange 307E. Opening 307D is adapted to be closed by a lid 309 which may be attached to the flange 307E as shown in FIG. 8. The back end 307C is welded to the outside surface of the outer wall 103 such that apertures 307A and 307B are in alignment with apertures 303A and 303B. The lid 309 has a pair of small apertures 303A and 303B for receiving the terminal ends 43A and 43B of the coil. Located within the pan 307 is heat insulation material 311 which may be hair-like mineral wool.

When assembling the heater coil in place, the lid 109 will be removed. The heater coil then will be located within the slots 197B of the brackets 197 such that the brackets 197 are located 120 apart. The coil and the brackets then will be tilted as the assembly is inserted in the interior of the chamber 41 to allow the terminal ends 43A and 43B to be inserted through the large aperture 301; through the smaller aperture 305A, 303A, 305B, and 303B, 307A, 307B; and then out through the large opening 307D of the pan 307. The heat insulation 311 then may be inserted within the pan 307 and packed around the terminal ends after which the lid 309 may be inserted in place. Suitable heat resistant flexible seals 313, 317, 315, and 317 may be provided to insure minimum of heat loss through the sealing pan 307.

In one embodiment, the walls 101, 103, 107, 131, and 137 and 151 and 141 of the chamber 41 may be formed of suitable mild steel. The heat activated catalyst 81 may be aluminium oxide ($Al_2O_3$) pellets although it is to be understood that other types of heat activated catalyst may be used or mixed with the aluminum oxide. The heat insulation material 106 located in the chamber 105 may be mineral wool.

DESCRIPTION OF THE PREFERRED EMBODIMENTS

Referring now to FIGS. 13-19, there will be described the modified catalyst chamber of the invention. In these Figs. like reference numerals identify the same components as in the embodiments of FIGS. 1-12. Perforations 123 are formed through the cylindrical wall 101 in a rectangular area and metal side wall structure 701 having walls 701A-701D forming a rectangular chamber when viewed from the open end thereof is secured to the wall 101 by tack welding at 703 the flanged ends 705 of the wall structure 701 to the wall 101. The wall structure 701 has an outer opening at 707 leading to the perforations 123. A removable container 711 rectangular in cross section as seen from its open end, is provided having an inner end wall 713 with perforations 715 and an outer open end 717. The four side walls of the container 711 are identified at 711A-711D. The container 711 can be inserted into the wall structure 701 through opening 707 with its end 713 located next to the perforations 121 and removed therefrom.

A guide 721 is attached to the four side walls 711A-77D of the container 711 for holding a seal 723 for forming a seal between the edges of the walls 701A-701D and the guide and container 711 when it is located in the wall structure 701. The guide 721 comprises four walls 721A-721D welded to the container walls 711A-711D respectively which extend outward and four side walls 721SA-721SD welded to the walls 721A-721D respectively forming a space 731 around the container 711 with a forward opening 733. Located in the space 733 and against the inside of the walls 721A-721D and around the container walls 711A-711D is the seal 723 which is formed of a soft seal material such as high temperature mineral wool woven string. When the end 713 of the container 711 is inserted into the opening 707 of the wall structure 701, its walls 701A-701D enter the space 731 formed between the side walls 721A-721D of the guide and the side walls 711A-711D of the container until the edges 701E of the walls 711A-711D of the container engage and press against the seal 723 which forms a seal between the edges 701E of the walls 701A-701D and the walls 721A-721D of the guide to prevent odor from by-passing the odor reducing catalyst under action of the suction induced by the exhaust blower downstream from the catalyst.

The catalyst comprises a single unit or cartridge 741 which is insertable into and removable from the container 711 by way of its open end 717. In one embodiment, the catalyst 741 comprises a plurality of monolithic tubular members 741T bonded together in a parallel relationship. The members 741T have openings formed therethrough with their open ends facing opposite facing sides 743 and 745 of the member 741. The tubular members 741T may be ⅛ of an inch square in cross section. The number 741 may have dimensions of 6 inch wide by 2 inches high by 2 inches deep such that if the square dimensions of the tubular members 741T are ⅛ inch by ⅛ inch, there will be 48×16 tubes in the structure 741. The catalyst structure 741 is commercially available from Met Pro. Co. of Penn. and the tubes 741T comprise ceramic coated with a heat activated catalyst of platinum and iridium for reducing odor. The catalyst structure 741 is inserted into the back end of the container 711 through its opening 717 with its open tubular ends at its sides 743 and 745 facing the perforations 715 of wall 713 and the open end 717 respectively. The side 743 is moved against the inside of the wall 713 and a plate 751 having perforations 751P is located in the container 711 against the side 745. The container 711 then is inserted into the wall structure 701 opening 707 with its perforated wall 713 facing the perforations 123 of cylindrical wall 101 until the edges 701E engage the seal 723. In order to replace the catalyst structure 741, the container 711 is removed from the wall structure 701, the perforated plate 751 and the catalyst structure 741 are removed from the container 711. A new catalyst structure 741 is inserted into the container 711 with the plate 751 and the container reinserted into the wall structure 701. Thus replacement of a spent catalyst is simple with no clean-up required.

Figure 19:
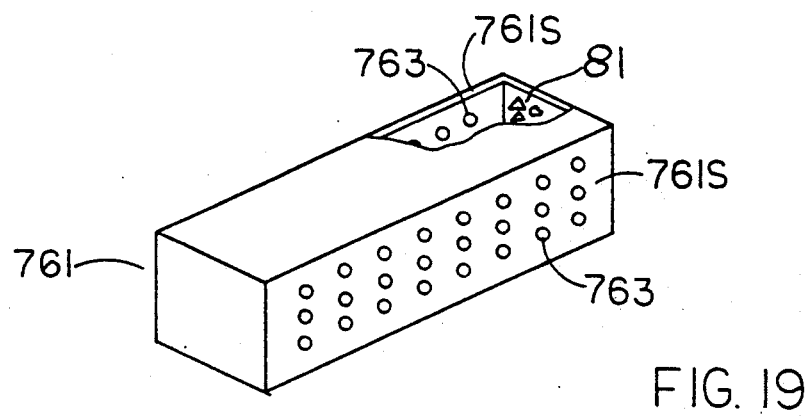
FIG. 19 illustrates another type of catalyst unit or cartridge.

FIG. 19 illustrates another type of catalyst cartridge 761. It comprises a six sided metal box, having aluminum oxide pellets 81 located therein. The box has two sides 761S with perforations 763 formed therethrough to allow gases to be drawn therethrough for reducing the odor from the incinerator chamber. The unit 761 is inserted into the container 711 with its sides 761S facing the perforations 715 and open end 717 but the plate 751 is not used. Thus the catalyst unit 761 is easily replaced when the catalyst is spent. The unit 761 has advantages over the unit 741 in that ash cannot as easily block gas flow therethrough.

Figure 13:
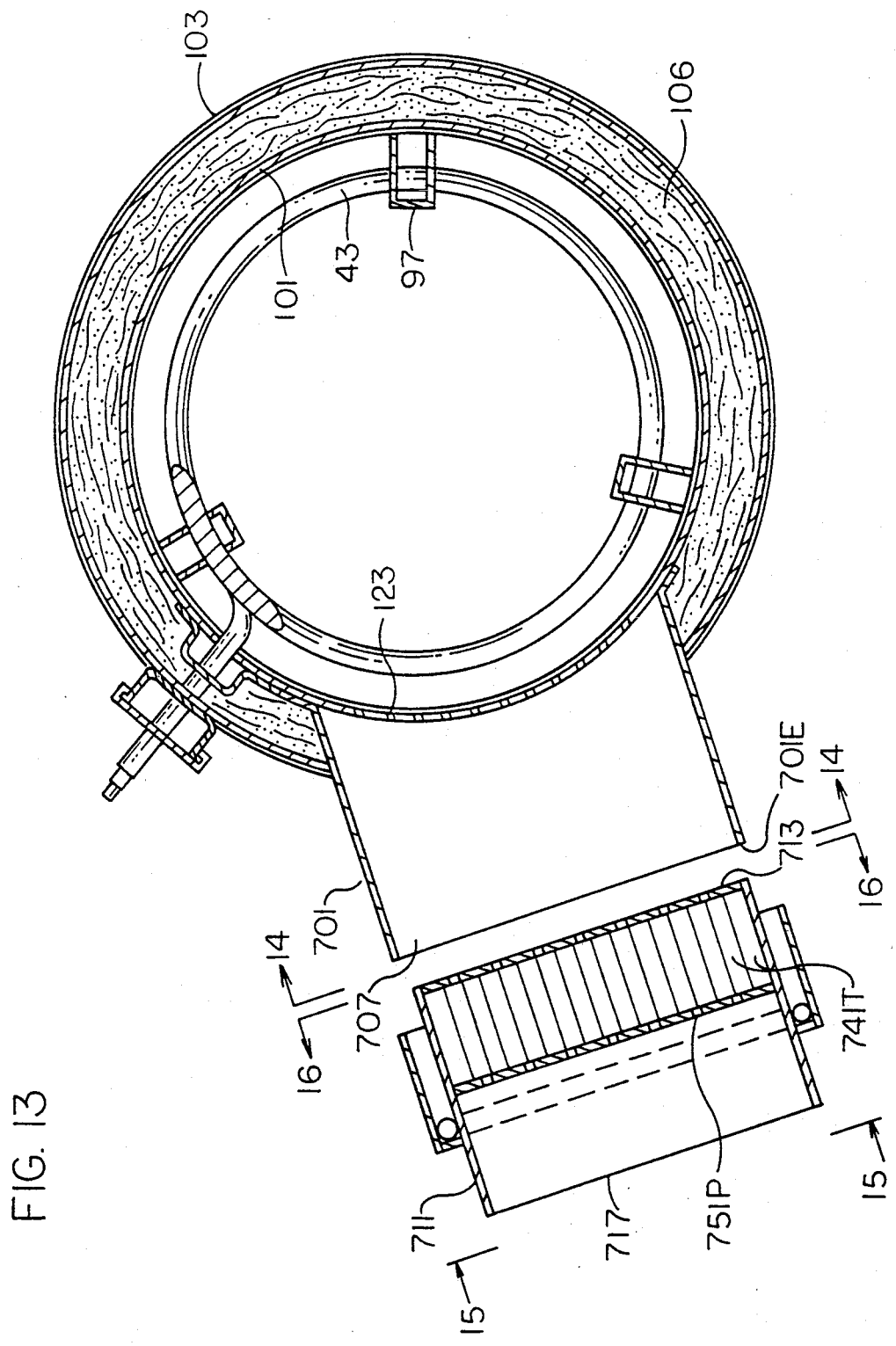
FIG. 13 is a cross-sectional view of the incinerator toilet of the invention with wall structure secured to the chamber inner wall for receiving a removable catalyst container.
Figure 17:
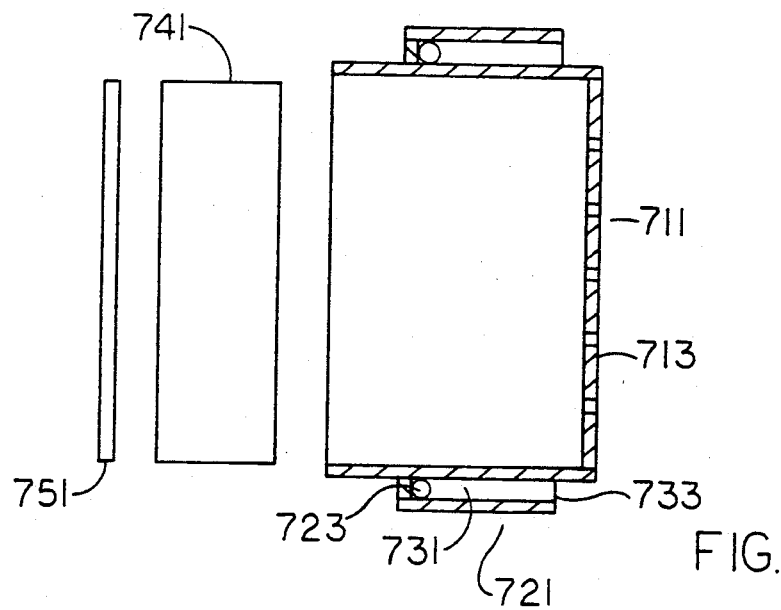
FIG. 17 is a cross-sectional view of the catalyst container with the catalyst unit or cartridge removed.
Figure 18:
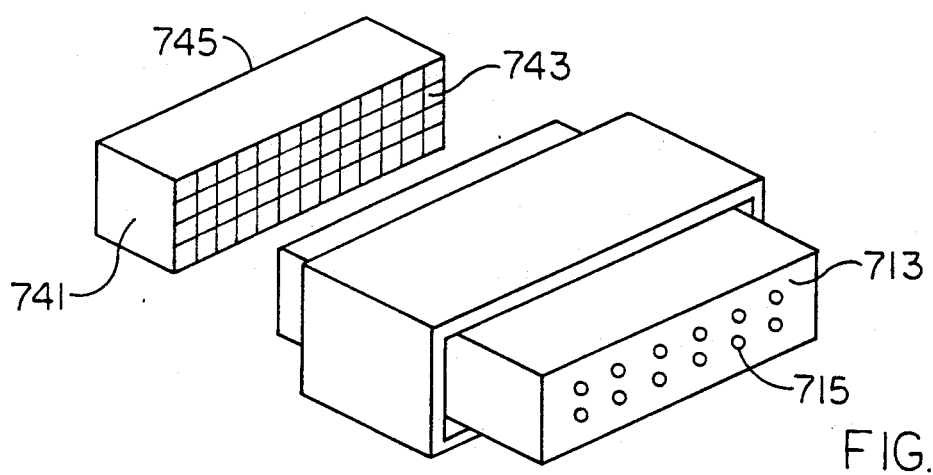
FIG. 18 is an isometric view of the catalyst container with the catalyst unit or cartridge removed.
Figure 14:
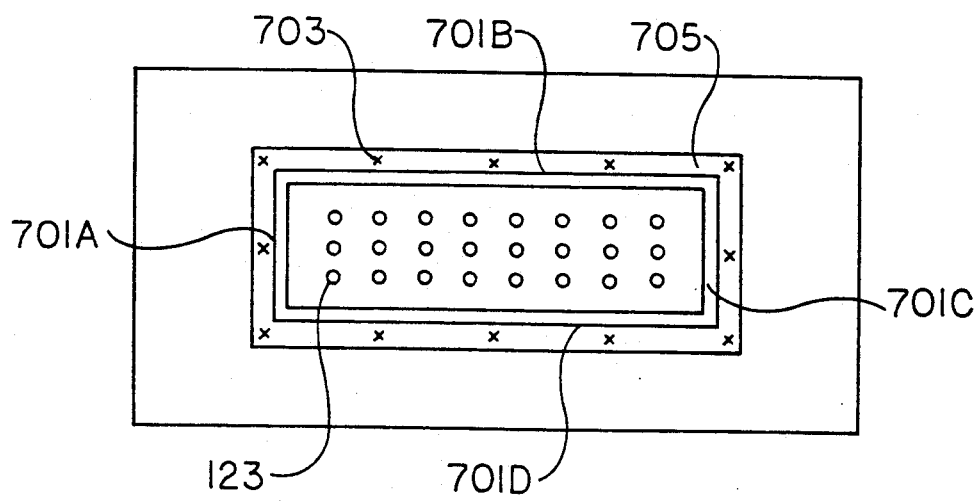
FIG. 14 is a side view of the chamber inner wall and catalyst container holding structure as seen from lines 14—14 of FIG. 13 with the chamber outer wall and heat insulation removed.
Figure 15:
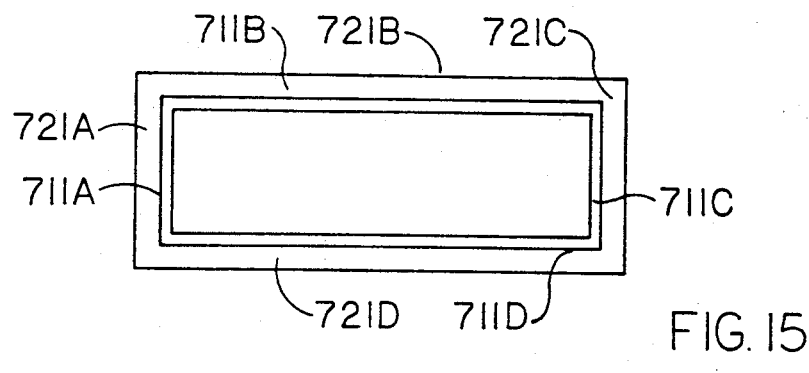
FIG. 15 is a view of the removable catalyst container of FIG. 13 as seen from lines 15—15 thereof with the catalyst unit or cartridge removed.
Figure 16:
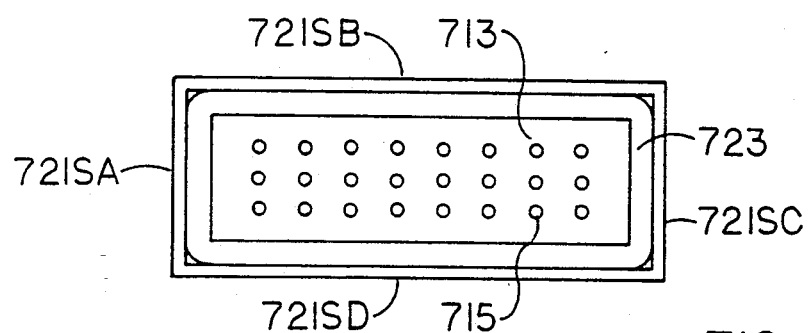
FIG. 16 is a view of the catalyst container of FIG. 13 as seen from lines 16—16 thereof.

The container 711 will have a depth sufficient to locate its open end 717 below the intake of the exhaust blower 61. In modifying the toilet of FIGS. 1-12 to use the catalyst structure of FIGS. 13-19, the catalyst chamber structure 107, 131, 191, 181 will be removed and the structure 701 attached as shown in FIG. 13 to allow use of the container 711 and catalyst cartridge 741 or 761. The perforations 123 will be formed through the wall 101 within the confines of the wall structure 701. The upper and lower walls 143 and 155 will be completely annular and will not have the wall portions 145 and 155. The rest of the components of the incinerator will be retained. An end with an upward extending opening may be removably secured to the open end of the container 711 such that the upward extending opening is located directly below the exhaust blower 61.

In using the apparatus of FIGS. 13-19, the exhaust motor 63 will be operated to draw gases from the chamber 41 by way of perforations 123, perforations 715, the tubular members 741T of the unit 741, perforations 751P of plate 751, the open end 717 of the container 711 and out of the toilet by way of the exhaust fan 61 and exhaust 65. If the catalyst cartridge 761 is used the gases will flow through the pellets 81 by way of perforations 763 of sides 761S.

What is claimed is:

1. An incinerator toilet comprising:

housing structure, an incinerator chamber located in said housing structure and comprising an inner cylindrical shaped side wall having an upper end and a lower end with a central opening extending therethrough, a bowl located above said chamber, a removable ash pan located below said lower end of said chamber, means for incinerating waste, said means being located in said central opening of said chamber, an outer wall located around said inner cylindrical shaped inner wall and spaced therefrom forming a heat insulation holding space, heat insulation material located in said heat insulation holding space, said inner cylindrical shaped wall having an area where perforations are formed therethrough, a wall structure forming a straight passageway, said structure being secured to said inner cylindrical side wall around said perforations and extending outward 14 to an outward end forming an outer opening leading to said perforations by way of said straight passageway, a movable container having inner and outer ends with said inner end being movable into and out of said straight passageway of said wall structure by way of said outer opening of said wall structure, said inner end of said container having openings and said outer end of said container having a rear opening located such that a straight passageway is formed between said rear opening and said openings, a catalyst member movable as a single unit into and out of said straight passageway of said container by way of said outer opening of said container, said catalyst member being capable of having gases drawn therethrough such that when said movable container with its inner end is located in said wall structure with said catalyst member located in said movable container, gases may be drawn from said incinerator chamber by way of said perforations, said wall structure, said container, and said catalyst member.

2. The incinerator toilet of claim 1 comprising:

seal means for forming a seal between said wall structure and said movable container when said inner end of said movable container is located in said opening of said wall structure.

3. The incinerator toilet of claim 1, wherein:

said container comprises a container wall surrounding said straight passageway of said container, a sealing wall surrounding a portion of said container wall between said inner and outer ends, said sealing wall having a rear end coupled to said container wall and a front end facing away from said outer end of said container forming a chamber surrounding said container wall for receiving said outward end of said wall structure, and means located in said chamber around said container wall for engaging said outward end of said wall structure for forming a seal between said container wall and said wall structure when said container is located in said straight passageway of said wall structure.

4. An incinerator toilet comprising:

housing structure, an incinerator chamber located in said housing structure and comprising an inner cylindrical shaped side wall having an upper end and a lower end with a central opening extending therethrough, a bowl located above said chamber, a removable ash pan located below said lower end of said chamber, means for incinerating waste, said means being located in said central opening of said chamber, an outer wall located around said inner cylindrical shaped inner wall and spaced therefrom forming a heat insulation holding space, heat insulation material located in said heat insulation holding space, said inner cylindrical shaped wall having an area where perforations are formed therethrough, wall structure forming a container receiving chamber, said wall structure being secured to said inner cylindrical side wall around said perforations and extending outwardly to an outward end forming an outer opening leading to said perforations by way of said container receiving chamber, a container having side walls forming a catalyst member receiving chamber, said container having inner and outer ends with openings at said inner end leading to said catalyst member receiving chamber and a rear opening at said outer end leading to said catalyst receiving chamber, said container being moveable through said outer opening of said wall structure into said container receiving chamber of said wall structure to locate said catalyst receiving chamber in said container receiving chamber of said wall structure with said inner end facing said perforations, said container being removable through said outer opening out of said container receiving chamber of said wall structure, a catalyst member movable as a single unit into said catalyst member receiving chamber of said container by way of said rear opening, said catalyst member being capable of having gases drawn therethrough for reducing odor such that when said container is located in said container receiving chamber with said catalyst member located in said catalyst receiving chamber, gases may be drawn from said incinerator chamber by way of said perforations and said catalyst member for reducing odor, said catalyst member being removable as a single unit out of said catalyst member receiving chamber of said container by way of said rear opening for replacement purposes.

5. The incinerator toilet of claim 4, comprising:

a sealing wall surrounding a portion of said side walls of said container, said sealing wall having a rear end coupled to said walls of said container and a front end facing away from said outer end of said container forming a surrounding chamber surrounding said walls of said container with an opening facing away from said outer end of said container for receiving said outward end of said wall structure, and a seal located in said surrounding chamber around said walls of said container for engaging said outward end of said wall structure for forming a seal between said walls of said container and said wall structure when said container is located in said container receiving chamber of said wall structure.

* * * * *